(12) United States Patent
Weiser et al.

(10) Patent No.: US 8,366,977 B2
(45) Date of Patent: Feb. 5, 2013

(54) PROCESS OF MAKING RECYCLED POLYAMIDE YARN

(75) Inventors: Alon Weiser, Netanya (IL); Boris Streltses, Migdal Haemek (IL); Uri Afek, Kiryat Tivon (IL); Alexander Yermolaev, Migdal Haemek (IL)

(73) Assignee: Nilit Ltd., Migdal Haemeck (IL)

( * ) Notice: Subject to any disclaimer, the term of this patent is extended or adjusted under 35 U.S.C. 154(b) by 437 days.

(21) Appl. No.: 12/616,955

(22) Filed: Nov. 12, 2009

(65) Prior Publication Data

US 2010/0119823 A1    May 13, 2010

(30) Foreign Application Priority Data

Nov. 13, 2008  (IL) .......................................... 195283

(51) Int. Cl.
| | |
|---|---|
| *B29C 47/92* | (2006.01) |
| *D01D 5/08* | (2006.01) |
| *D01F 6/60* | (2006.01) |
| *D01F 13/00* | (2006.01) |
| *D02G 1/02* | (2006.01) |
| *D06M 23/00* | (2006.01) |

(52) U.S. Cl. ........ 264/37.28; 57/284; 264/40.4; 264/78; 264/103; 264/168; 264/176.1; 264/211.12

(58) Field of Classification Search ............... 264/37.28, 264/40.4, 40.7, 78, 103, 168, 176.1, 211.12; 8/494; 57/284
See application file for complete search history.

(56) References Cited

U.S. PATENT DOCUMENTS

| | | | | |
|---|---|---|---|---|
| 3,653,094 | A * | 4/1972 | Fairfield | ............................ 19/83 |
| 5,166,278 | A * | 11/1992 | Rao | ....................... 264/211.22 X |
| 5,185,117 | A * | 2/1993 | Hawley | ..................... 264/211.12 |
| 6,187,917 | B1 | 2/2001 | Mayer et al. | |
| 7,319,113 | B2 | 1/2008 | McKinnon | |
| 2004/0053047 | A1 | 3/2004 | Jackson et al. | |
| 2004/0249001 | A1 | 12/2004 | Leboeuf | |
| 2006/0185343 | A1* | 8/2006 | Coombs | ......................... 57/210 |

* cited by examiner

*Primary Examiner* — Leo B Tentoni

(74) *Attorney, Agent, or Firm* — Hunton & Williams, LLP

(57) ABSTRACT

Provided is a process for manufacturing a polyamide yarn exhibiting good dyeability, while utilizing polyamide waste. The recycled polyamide yarn with a high waste polymer content is used for making quality articles by a low cost method, which is further friendly to the preservation of the environment.

9 Claims, 1 Drawing Sheet

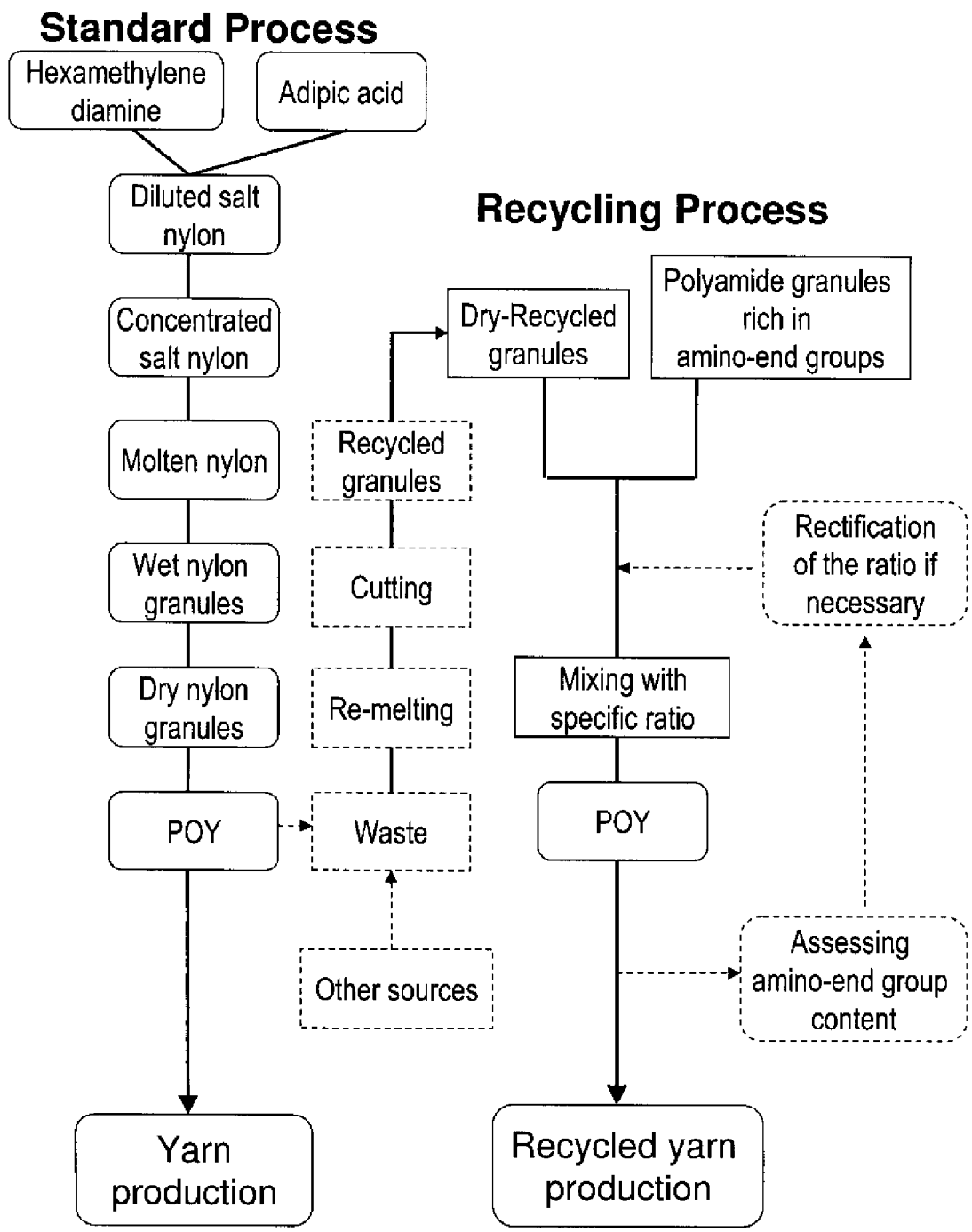

PROCESS OF MAKING RECYCLED POLYAMIDE YARN

FIELD OF THE INVENTION

The present invention relates generally to synthetic polymer fibers, and more specifically to a process for making recycled polyamide yarns having a good dyeability with industrial polyamide waste.

BACKGROUND OF THE INVENTION

Nylon is a synthetic polymer, invented by Wallace Carothers of the E.I. du Pont de Nemours and Company in 1935. The first product, a nylon bristle toothbrush made went on sale in 1938. Nowadays, the most commonly used nylon are nylon 66, also called nylon 66 (polyhexamethylenediamine adipamide), originally patented by DuPont, and nylon 6 (polycaprolactamide) produced by IG Farben.

Nylon 6 polymer is produced from caprolactam. Caprolactam is derived most commonly from cyclohexanone, which in turn comes from either phenol or cyclohexane. About 70% of all nylon 6 polymer is produced by continuous polymerization. Nylon 66 polymer is made from adipic acid and hexamethylene diamine, which react to form hexamethylene diammonium adipate (AH salt). Polymerization then takes place under heat and pressure in a batch process. The fiber spinning and processing procedures are achieved by using a process called melt spinning. Melt spinning uses heat to melt the polymer to a viscosity suitable for extrusion. This type of spinning is used for polymers that are not decomposed or degraded by the temperatures necessary for extrusion. Polymer chips may be melted by a number of methods. The trend is toward melting and immediate extrusion of the polymer chips in an electrically heated screw extruder. Alternatively, the molten polymer is processed in an inert gas atmosphere, usually nitrogen, and is metered through a precisely machined gear pump to a filter assembly consisting of a series of metal gauges interspersed in layers of graded sand or metal powder. The molten polymer is extruded at high pressure and constant rate through a spinnerette into a relatively cooler air stream that solidifies the filaments. Lubricants and finishing oils are applied to the fibers in the spin cell. At the base of the spin cell, a thread guide converges the individual filaments to produce a continuous filament yarn, or a spun yarn, that typically is composed of between 15 and 100 filaments. Once formed, the filament yarn is immediately wound onto bobbins, or it is further treated for certain desired characteristics or for end use (texturisation). Polyamide yarns made from Nylon 6, 66, 69 and 610 can be used in the textile industry in both knitting and weaving with high efficiency to form high quality and fashionable garments. These polymers, especially Nylon 6 and 66 are used in the production of knitted leg-wear and body-wear garment. In these products, dyeing efficiency and cost effective dyeing processes are important considerations.

Total world demand for nylon resins reached 2.3 million metric tons in 2006 (E. V. Ormonde and H. Mori, "Nylon Resins", CEH Report, 2007). Total world consumption of nylon resins is forecast to increase to about 2.8 million metric tons by 2011, representing an average annual growth rate of 4%. Reasonably good growth is projected to have resumed in major markets such as automotive parts, industrial/machinery, electrical/electronics and film in 2007. In the United States, nylon 66 is the major type of nylon resin produced, in part because of DuPont's major position in the production of this polymer. In Japan, nylon 6 is the major resin type. In Western Europe, however, the market share of nylon 66 is about equal to that of nylon 6. Other nylons (e.g., nylons 11 and 12) are considered specialty products and are consumed in much smaller quantities Nowadays, numerous efforts have been made toward environmentally responsible methods of manufacturing nylon, including finding ways to use waste products from the manufacture of various synthetic materials (post-industrial waste) and recycling waste from synthetic products (post-consumer waste). Typical post-industrial waste synthetic polymeric product are leftovers from the different manufacturing steps, such as extrusion or molding of a polymeric product from virgin polymer. For instance, when nylon is spun into yarn, there is a leftover fiberstock that is off-specification yarn that would be disposed by the manufacturer. Such leftover can be treated to form flakes, chips or pellets, and it can be recycled in the process of the present invention. Other kind of recovery processes are monomer recovery systems, which are especially used on caprolactam volatilized at the spinnerette during nylon 6 fiber formation. Monomer recovery systems are not used in nylon 66 spinning operations, because nylon 66 does not usually contain a significant amount of residual monomer. Recycling method for post-consumer waste of nylon 6 based material is described for example in U.S. Pat. No. 6,187,917. Concerning the treatment of nylon 66, most of the methods known in the prior art are directed towards recycling post-consumer waste, e.g. synthetic carpets, in order to reintroduce the gathered polymer into recycling processes. The same methods are generally applied for recycling post-industrial waste, as described in the following publications:

U.S. Pat. No. 7,319,113 relates to a process for recovering polyamide material from post-industrial and post-consumer products containing a polyamide material. Said process includes contacting the post-industrial and post-consumer products with a suitable solvent in a reactor; dissolving and partially depolymerizing the polyamide material in the solvent to form a solution; separating the insoluble material from the solution; and recovering the depolymerized polyamide from the separated solution.

US 2004/0249001 relates to a process for the solution recovery of nylons from various post-industrial and post-consumer products. Said process includes contacting the waste products with hexamethylene diamine and in a suitable solvent in a reactor; dissolving and depolymerizing the polyamide material; separating insoluble materials from the solution; recovering of the depolymerized polyamide from the separated solution; and repolymerizing the depolymerized polyamide.

US 2004/0053047 relates to a process for making colorable mono-component filament. Said process comprises: blending virgin polymer A and a recycled polymer A to form a mixture; and forming the mixture into colorable mono-component filaments that have good colorability characteristics, comparable to those of colorable mono-component filament formed from the virgin polymer A free of the recycled polymer A. However, the described process lacks a monitoring system which may control in real-time the quality of the filaments produced and readjust, if necessary, the virgin polymer/recycled polymer ratio. This is an essential feature to guarantee the quality and homogeneity of the filaments produced in a continuous recycling process, where the source and quality of the recycled polymer may vary.

Most of the above-mentioned methods involve numerous complicated steps, including depolymerization and repolymerization of the polymer in various solvents, and several steps of purification/separation before obtaining the recycle polyamide. There is therefore a need for a simple method to obtain recycled polyamide yarns from waste polymer which could overcome the disadvantages of the prior art.

It is therefore an object of the present invention to provide a method for the production of polyamide yarns, more friendly to the preservation of the environment than known methods.

It is further an object of the present invention to provide a convenient, low cost, and power saving method for the production of recycled polyamide yarns with polyamide from post-industrial waste.

It is another object of the present invention to provide a method for the production of recycled polyamide yarns with a high waste polymer content.

It is still another object of the present invention to provide a method for the continuous production of recycled polyamide yarns including a monitoring step for checking the quality of the produced yarns and readjusting in real time, if necessary, the composition of the initial blend mixture.

It is a still further object of the present invention to provide a method for the production of recycled polyamide yarns having improved elongation capacity and a dyeability similar to non-recycled yarns.

Other objects and advantages of the present invention will appear as the description proceeds.

SUMMARY OF THE INVENTION

The present invention is a process for manufacturing a recycled polyamide yarn exhibiting good dyeability, comprising the steps of:
(i) providing an industrial polyamide waste (IPW), having a concentration of amino-end groups (AEG) of from about 20 meq/kg to about 35 meq/kg;
(ii) providing a polyamide rich in amino end-groups (PRA), having a concentration of AEG of from about 75 meq/kg to about 95 meq/kg;
(iii) mixing said IPW with said PRA in a gravimetric dosing system; and
(iv) melt-spinning the mixture.

In one embodiment of the process of the invention, the concentration of amino-end groups of the recycled polyamide yarn is continuously assessed, and the PRA/IPW ratio in step (iii) may be adjusted in real-time. The recycled yarn has preferably a concentration of amino end-groups of from 36 meq/kg to 50 meq/kg, and the weight ratio between the IPW and the PRA is preferably in the range of 80:20 to 90:10. In another embodiment of the process of the invention, step (i) comprises remelting the IPW and processing it into granules of recycled IPW. In still another embodiment of the process of the invention, said process further comprises texturing steps of the recycled polyamide yarn, such as a false twist texturing step or a dyeing step.

In one embodiment of the process of the invention, the IPW is POY waste, and the polyamide used is preferably, but is not limited to, nylon 66. The present invention is also any recycled polyamide yarn manufactured according to the above-described process or any article comprising such yarn.

BRIEF DESCRIPTION OF THE DRAWINGS

The above and other characteristics and advantages of the invention will be more readily apparent through the following examples, and with reference to the appended drawings, wherein:

FIG. 1. is a process diagram showing in parallel the standard process for the production of nylon yarn and a recycling process in one embodiment of the invention.

DETAILED DESCRIPTION OF THE INVENTION

The present invention provides a method for the production of recycled nylon yarns from post-industrial polymer waste, said yarns having a dyeability similar to the non-recycled nylon yarn. The present invention relates in particular to, but is not limited to, production of thin filament yarns, suitable for use in the textile industry.

It has been found that high-quality recycled polyamide yarns can be produced by mixing industrial polyamide waste (IPW), which have a low amine end groups content, with a polyamide rich in amino-ends group (PRA). Industrial waste of polyamides, preferably from partially-oriented yarns (POY), is compressed remelted, solidified, and cut into solid small entities, such as granules. Granules comprising IPW can be stored or directly used by adding to them PRA polymer for the production of recycled polyamide yarns. The mixture is preferably formed at the throat of the extruder by mixing the PRA and the IPW with a gravimetric dosing system, which allows to choose or modify in real-time the ratio of the mixed polymer in said mixture. The mixture comprises preferably 80-90% (w/w) of IPW with an amine end-groups concentration in the range of from 20-35 meq/kg, and preferably 10-20% PRA with an amine end-groups concentration in the range of from 60-95 meq/kg, and preferably about 85 meq/kg. The relative viscosity (RV) of the polymers is preferably in the range of RV=34-65.

The mixture IPW and PRA is then converted into fibers by melt spinning process, at typical winding speeds of 550-1200 for LOY process and 3500-6000 for POY or FDY processes. The recycled nylon yarns are typically in the range of 20-100 denier with 7-100 filaments, and have an amine end-groups concentration in the range of from 36-60 meq/kg, suitable for textile applications. It has been also surprisingly found that performing the process of the invention enables to produce yarns with superior rheological properties, if compared to the non-recycled yarns, in particular in view of the elongation properties. The recycled yarns may be then processed on the texturing equipment, or draw-winding or draw-twisting machines to form the final yarn product. The textile article is dyed in a single dyeing process. Typically, the recycled yarn is dyed with an acid dyestuff by applying a standard procedure.

As the quality of the recycled polymer may vary during the process of production of recycled yarns, the present invention provide a monitoring system which assess in real-time the quality of the produced filaments and may readjust, if necessary, the IPW/PRA ratio in the initial mixture, therefore guaranteeing a constant quality of the final product whatever the source of recycled polymer. This ratio can also be changed if specific characteristics, e.g. amino-end content, rheological properties, etc., in the final product are desired or need to be adjusted.

The method of the present invention therefore enables the production of high-quality recycled polyamide yarns with a reduced number of steps. Therefore, this invention aims to have a real beneficial impact in the environment by both reducing the amount of waste produced in the standard manufacture of polyamide yarns but also by significantly decreasing the need of raw material and energy. The low amine end groups content of the chips produced by remelting industrial polyamide waste is palliated by the admixing of a polyamide rich in amino ends group. Preferably, POY waste is chosen as IPW, as it improves the spinning efficiency and avoid abnormal pack pressure.

The following Examples are presented to provide a more complete understanding of the invention and are not to be construed as limitations thereof.

EXAMPLES

Polymerization Process 1

Nylon 66

An aqueous solution of hexamethylene diammonium adipate (AH salt) is charged into a stainless steel batch autoclave, under a nitrogen blanket. The autoclave is heated in order to distill the water, at a pressure of 18 kg/cm$^2$. As the autoclave temperature reaches 244° C., the pressure is gradually released over a period of 40 minutes. The polymer is then discharged from the vessel under nitrogen pressure, and chilled by water. The solid polymer streams ("spaghetti") are chopped into nylon 66 chips. The polymer is characterized by a relative viscosity of RV=38-44, amine end-group concentration of 38-43 meq/kg, and the concentration of titanium dioxide of 0.03-1.5% by weight.

Polymerization Process 2

Nylon 66 Rich in Amino End-Groups

The process is similar to that described above for the first polymer, except that in addition to the AH salt, an aqueous solution of hexamethylene diamine (HMD) is also charged into the autoclave. The additional HMD quantity is 0.5% of the total AH salt. The resulting nylon 66 polymer has a relative viscosity of RV=46-48, and amine end-group concentration of 80-89 meq/kg, and the concentration of the titanium dioxide of 0.3% by weight.

POY Spinning Process 1

55/34 POY

The polymer chips are spun in a POY process under the following conditions:

TABLE 1

| Conditions | |
|---|---|
| Polymer temp. (° C.) | 288 |
| Extruder pressure (atm) | 100 |
| Pack pressure (atm) | 220 |
| Spin finish concentration (%) | 0.5 |
| Winding speed (m/min) | 4500 |

Texturing Process 1

44/34/1 Yarn

The 44/34/1 yarns are textured under the following conditions:

TABLE 2

| Conditions | |
|---|---|
| Winding speed (MPM) | 611 |
| Sequential draw ratio | 1 |
| Simultaneous draw ratio | 1.3 |
| Overfeed (%) | −3.37 |

TABLE 2-continued

| Conditions | |
|---|---|
| D/Y ratio | 2.14 |
| Heater temperature (° C.) | 215 |
| Disc configuration | 1-7-1 |

Comparative Example 1

55/34 POY

Industrial polyamide waste (IPW) from off spec POY yarns having a relative viscosity of RV=44 and an amino end group content of 33 meq/kg was mixed, at the throat of extruder by a dosing system, with a polyamide rich in amino end-groups (PRA), having a relative viscosity of RV=48 and an amino end group content of 85 meq/kg, in different ratio and spun using melt spinning machine to 55 dtex 34 filaments POY yarn, in conditions as disclosed in Table 1. As for comparison, a regular polymer produced by a polymerization process as disclosed in polymerization process 1 was spun in the same conditions (Example 4). The properties of the resulting yarns are shown in the following table:

TABLE 3

| | Example No. | | | |
|---|---|---|---|---|
| | 1 | 2 | 3 | 4 |
| IPW content (%) | 80 | 85 | 90 | NA |
| PRA content (%) | 20 | 15 | 10 | NA |
| Titer (dtex) | 55.7 | 55.1 | 54.9 | 56 |
| Tenacity (cN/dtex) | 3.40 | 3.44 | 3.47 | 3.68 |
| Elongation (%) | 84.4 | 77.9 | 79.4 | 69.7 |
| Relative viscosity (RV) | 43.5 | 38.2 | 36.5 | 44.3 |
| Amino end groups (meq/kg) | 45.8 | 41.1 | 38.8 | 40.5 |

As it can be seen from the table above, the amine end group concentration in the recycled yarn is in the same range than the amine end group concentration of the virgin polymer. The level of amine end group can be adjusted by changing the IPW/PRA ratio when introduced in the throat of the extruder.

Comparative Example 2

44/34/1 Yarns

The yarns of the above example were textured on false twist texturing machine in conditions as disclosed conditions in Table 2. The properties of the resulting textured yarns are shown in the following table:

TABLE 4

| | Example No. | | | |
|---|---|---|---|---|
| | 1T | 2T | 3T | 4T |
| POY No. (from Table 3) | 1 | 2 | 3 | 4 |
| IPW content (%) | 80 | 85 | 90 | NA |
| PRA content (%) | 20 | 15 | 10 | NA |
| Titer (dtex) | 43.7 | 44 | 44 | 46.2 |
| Tenacity (cN/dtex) | 3.61 | 3.62 | 3.53 | 4.02 |
| Elongation (%) | 27.2 | 24.7 | 24.3 | 22.2 |
| Crimp Contraction (%) | 51.3 | 47.3 | 48.4 | 43 |
| Crimp Modulus (%) | 25.3 | 21.8 | 22.7 | 19.2 |
| Crimp Stability (%) | 90.5 | 89.3 | 90.5 | 90.6 |

The rheological properties of textured recycled polyamide yarn are close to those from regular yarn specifications. Titer and elongation can be adjusted by changing POY titer and draw ratio.

While embodiments of the invention have been described by way of illustration, it will be understood that the invention can be carried out by persons skilled in the art with many modifications, variations and adaptations, without departing from its spirit or exceeding the scope of the claims.

The invention claimed is:

1. A process for manufacturing a recycled polyamide yarn comprising a high content of polyamide waste and exhibiting good dyeability, comprising the steps of:
   (i) providing an industrial polyamide waste (IPW) having a concentration of amino-end groups (AEG) of from about 20 meq/kg to about 35 meq/kg;
   (ii) providing a virgin polyamide rich in amino end-groups (PRA), having a concentration of AEG of from about 75 meq/kg to about 95 meq/kg;
   (iii) mixing said IPW with said PRA in a gravimetric dosing system, wherein the concentration of amino end groups of said recycled polyamide yarn is assessed and the PRA/IPW ratio in step (iii) is adjusted in real-time; and
   (iv) melt-spinning the mixture;
   wherein said high content of polyamide waste comprises at least 80 wt % of said recycled polyamide yarn.

2. A process according to claim 1, wherein said step (i) comprises remelting said IPW and processing it into granules of recycled IPW.

3. A process according to claim 1, wherein said IPW is waste from partially-oriented yarns (POY).

4. A process according to claim 1, wherein the weight ratio between said IPW and said PRA is in the range of from 80:20 to 90:10.

5. A process according to claim 1, wherein said polyamide is nylon 66.

6. A process according to claim 1, further comprising texturing said recycled polyamide yarn.

7. A process according to claim 6, wherein said texturing comprises a false twist texturing step.

8. A process according to claim 6, wherein said texturing comprises a dyeing step.

9. A process according to claim 1, wherein said recycled yarn has a concentration of amino end-groups of from 36 meq/kg to 50 meq/kg.

* * * * *